ELECTRO-OPTICAL SIGNAL TRANSFER APPARATUS

Filed Dec. 11, 1967 2 Sheets-Sheet 1

INVENTOR.
Adrianus Korpel
BY
Francis W. Crotty
Attorney

ELECTRO-OPTICAL SIGNAL TRANSFER APPARATUS

INVENTOR.
Adrianus Korpel
BY
Francis W. Crotty
Attorney

United States Patent Office 3,544,795 Patented Dec. 1, 1970

3,544,795
ELECTRO-OPTICAL SIGNAL TRANSFER APPARATUS

Adrianus Korpel, Prospect Heights, Ill., assignor to Zenith Radio Corporation, Chicago, Ill., a corporation of Delaware

Filed Dec. 11, 1967, Ser. No. 689,542
Int. Cl. H04b *9/00*
U.S. Cl. 250—199 11 Claims

ABSTRACT OF THE DISCLOSURE

The apparatus includes a laser for directing a beam of spatially coherent light along a first path and an acoustic cell, to which input signals are applied, propagates across the path of the laser beam acoustic waves corresponding in frequency and amplitude to the components of the input signal. Their interaction diffracts the beam along a plurality of paths respectively representing the different frequency components of the input signal. A first optical system projects the diffracted beams upon an image plane and another optical system derives some of the laser light ahead of the acoustic cell for use as a reference beam in a manner analogous to a local oscillator in a heterodyning system.

A second optical system superposes the reference and diffracted beams at the image plane where a detector responds and derives the output signals in a heterodyning process. A tilted mirror, wedge, convergent lens or other optical element in the path of the reference beam causes the effective lengths of the optical paths of the reference and diffracted light beams to vary in accordance with some selected function of frequency of the input signals; therefore, the output signals are related to the input signals by this same function. The use of a converging lens causes the input and output signals to be related in accordance with a quadratic function of the frequency of the input signal so that the system simulates a dispersive time delay network.

BACKGROUND OF THE INVENTION

The present invention is directed to electro-optical signal transfer apparatus and concerns more particularly electro-optical apparatus that may simulate electrical networks in transferring input signals to output terminals in accordance with a desired transfer function that is imposed primarily by the optical processing of the apparatus.

Of course, electrical networks are well known for transferring applied input signals to output terminals where the output signals are related to the input signals in accordance with some desired transfer function. For example, electrical networks which exhibit a linear phase-frequency characteristic are used as linear delay lines, exhibiting a fixed or a variable time delay. Other networks are known having the characteristic of dispersive lines in which the time delay exhibited by the network is linearly related to the frequency of the applied signals. It is desirable, in the further development of the interaction between light and acoustic wave energy, to provide electro-optical signal transfer apparatus that may simulate such electrical networks and have a flexibility for conveniently determining the transfer function of the simulated network. That objective is realized by the present invention.

Accordingly, it is an object of the invention to provide a new and improved electro-optical signal transfer apparatus.

It is another specific object of the invention to provide a signal transfer apparatus in which optical elements impose desired transfer characteristics to simulate any of a variety of electrical networks.

A particular object of the invention is to provide such a transfer apparatus in which the output signals are related to the input signals in accordance with some selected function of frequency.

Still another particular object of the invention is to provide an electro-optical signal transfer apparatus which simulates an electrical time delay network.

RELATED APPLICATION

The subject invention is related to and is a further development of signal translating apparatus described in application Ser. No. 388,589, filed Aug. 10, 1964, in the name of Robert Adler and assigned to the asignee of the present invention. That application issued as Patent 3,431,504 on Mar. 4, 1969.

SUMMARY OF THE INVENTION

An electro-optical signal transfer apparatus constructed in accordance with the invention comprises means for developing a beam of spatially coherent light which is directed along a first path. There is a source of input signals which may have a plurality of different frequency components with respective amplitude-time characteristics, and acoustic means respond to such input signals for propagating acoustic waves of corresponding frequency and amplitude across the path of the light beam. As a result of the interaction, portions of the light beam are diffracted along a plurality of paths respectively representative of the different frequency components of the input signals and with each portion having an intensity corresponding to the amplitude of the respective one of the frequency components. A first optical system disposed in the paths of the plurality of diffracted beams projects those beams upon an image plane. There are means for supplying a reference beam of spatially coherent light with intensity and phase characteristics having a predetermined relation to those of the first-mentioned beam and for directing the reference beam along another path. A second optical system disposed in that other path superposes the reference beam upon the diffracted beams at the image plane. Control means are included in at least one of the first and second optical systems for causing the phase fronts of the reference and diffracted light beams to vary in relation to one another in accordance with a predetermined function. A detector located at the image plane derives from the superposed reference and diffracted beams output signals which are related to the input signals in accordance with that function.

In one aspect of the invention, the phase fronts of the superposed beams, or the effective lengths of their respective optical paths, are varied in accordance with a predetermined function of the frequency of the input signals. In illustrative embodiments of the invention, this may be a linear or a square function of frequency and the output signals are similarly related to the input signal by the same function of frequency.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF PREFERRED EMBODIMENTS

Before describing the specifics of the present invention and the manner in which it permits imposing a desired transfer function by modification of phase fronts or effective path lengths of a reference light beam and a signal modulated light beam, FIG. 1 will be explained since it is a prior arrangement to which the invention may be readily applied.

Figure 1:
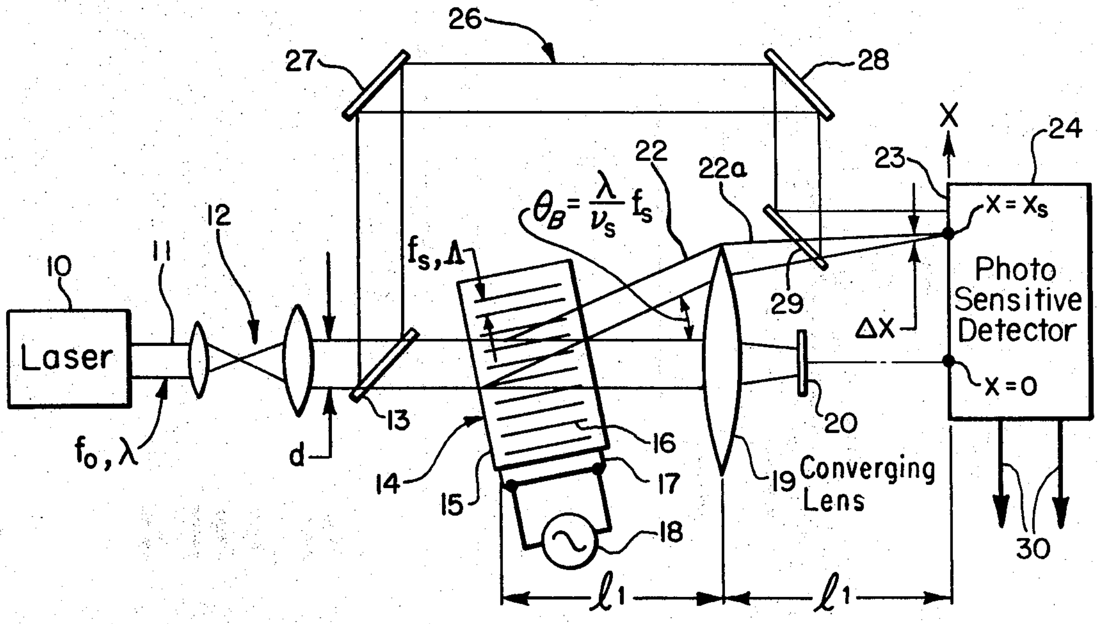
FIG. 1 is a diagrammatic view of a prior form of electro-optical signal transfer apparatus.

The electro-optical signal transfer apparatus of FIG. 1 comprises means for developing a beam of spatially coherent light directed along a first path. The term "light" is here used to denote radiation which is capable of being acted upon by typical optical components such as lenses and is to include such radiation as occurs in the infrared, visible and ultraviolet portions of the energy spectrum. It is convenient to utilize visible light and the description will proceed on the assumption that visible light is employed. The light beam is developed by a laser 10 and is projected along a path 11 through a telescope 12 which enlarges the diameter of the beam to a value represented by dimension line *d*. In traversing this path, light from laser 10 encounters a partially reflective mirror 13 which is provided for purposes to be described presently and a portion of the light passes through the mirror and continues along path 11.

Input signals, which are to be processed by the apparatus under consideration while being conveyed as modulation upon the light beam traversing path 11, are supplied by an input signal source 18. The input signals may have a plurality of different frequency components with respective amplitude-time characteristics. Modulation of the of the light beam by the input signals is accomplished by acoustic means, specifically, a light-acoustic wave interaction cell 14, which responds to the input signals for propagating acoustic waves of corresponding frequency and amplitude across the path of the light beam. Such a cell is now well known in the art and includes a medium 15, which may be water, transparent to light and which propagates waves 16 of acoustic energy produced by a transducer 17 coupled to medium 15 and energized by signal source 18 to the end that the acoustic waves have the necessary correspondence in frequency and amplitude to the components of the signals from source 18. Part of the light entering cell 14 is unaffected and continues along path 11 through a convergent lens 19 to a non-reflecting light-opaque member 20 where it is stopped and absorbed. This part of the light from laser 10 makes no contribution to the signal transfer function of the apparatus; accordingly, it will not be considered further.

Another portion of the light entering cell 14, however, is diffracted by the acoustic wave fronts propagating through the cell and exits along a path, such as that designated 22, at an angle $\theta_B$ with respect to path 11. As will be explained more particularly hereafter, the angle of diffraction is a function of the frequency of the acoustic wave and where the input has a plurality of different frequency components, various portions of the light entering cell 14 are diffracted along a variety of paths respectively representative of different frequency components and with each such portion having an intensity corresponding to the amplitude of the respective one of the frequency components.

A first optical system disposed in the paths of the diffracted beams projects those beams upon an image plane designated X. As shown, this optical system comprises a convergent lens 19 which causes the diffracted beams, such as that traversing path 22, to emerge from the lens along a path, such as path 22a, through a partially reflective mirror 29 and into impingement with the active surface 23 of a photosensitive detector 24 positioned in image plane X. Any portion of the beam 22a which is reflected at mirror 29 away from image plane X serves no function in the signal transfer process and, therefore, has not been represented in the drawing and will not be considered further.

Lens 19 is disposed so that both the interaction region within cell 14 and the active surface 23 of detector 24 individually lie along respective focal planes of the lens. These focal planes are each spaced from the lens by a distance $l_1$. In short, the optical system including lens 19 focuses the diffracted beams in a focal plane of the lens, this being the plane X.

The signal transfer apparatus contemplates the use of a reference beam of spatially coherent light, the intensity and phase characteristics of which have a predetermined relation to those of the beam developed in laser 10, in a heterodyne process with the diffracted beams to derive output signals from the apparatus. Accordingly, there are means for supplying such a reference beam and for directing it along another path to the focal or image plane X. While the reference beam may be developed in a local source, as a practical matter it is convenient to derive it from the beam traversing path 11 and that is the function of mirror 13 which reflects part of that light away from path 11 and along a path 26 which may be referred to as a reference or local oscillator path. This path is defined by a second optical system which superposes the reference beam upon the diffracted beams at the image plane X. As shown, mirror 13 is oriented at an angle of 45° relative to path 11, directing the reference light beam to a mirror 27 having a similar orientation to direct the beam to a third mirror 28. This mirror as well as partially reflective mirror 29 are also oriented at 45° as required to superpose the reference beam upon the diffracted beams in the focal plane X.

As indicated above, the photosensitive surface 23 of detector 24 is positioned in focal plane X to respond to the superposed reference and diffracted light beams and derive output signals therefrom in accordance with the known principles of heterodyne detection. The output signals appear at terminals 30 and are related to the input signal in accordance with the transfer function represented by the optical processing apparatus. The prior art arrangement of FIG. 1 simulates a linear all-pass electrical network and its operation is as follows:

Acoustic waves 16 in cell 14 create a periodic variation of the index of refraction of medium 15 that acts as a moving three-dimensional phase grating to deflect the incoming light. When the interaction length *s* through which the light of wavelength λ passes while interacting with sound of wavelength Λ, satisfies the condition $$s \gg \frac{\Lambda^2}{\lambda} \tag{1}$$

the cell is said to operate in the "Bragg" region. When operating in that region, such a cell deflects a fractional portion of a collimated beam of light directed therethrough through the unique angle $$\theta_B = \sin^{-1}\left[\frac{\lambda}{\Lambda}\right] = \sin^{-1}\left[\frac{\lambda}{v_s} f_s\right] \tag{2}$$

where $v_s$ is the sound velocity in the cell and $f_s$ is the acoustic-wave frequency. For small angles, $$\theta_B \cong \frac{\lambda}{v_s} f_s \tag{3}$$

For efficient interaction, it is necessary that the light beam incident upon cell 14 form a relaxed angle. The so-called Bragg angle, with the sound wavefronts; that is:

$$\phi_B = \pm \sin^{-1}\left[\frac{\lambda}{2\Lambda}\right] \tag{4}$$

Again, for small angles:

$$\phi_B \cong \frac{\lambda}{2\Lambda} \tag{5}$$

and it will be noted that $\theta_B \approx 2\phi_B$ at such small angles. The allowable tolerance on the direction of the incoming light is of the order of the diffraction spread of the sound beam, i.e., $$\Delta\phi_B \cong \frac{\Lambda}{s} \quad (6)$$

or in other terms, the range of sound frequencies $\Delta f$ that effectively interact with light incident at a fixed angle is given by $$\frac{\Delta f}{f_o} = \frac{2\Lambda_o^2}{s\lambda} \quad (7)$$

where $f_o$ and $\Lambda_o$ refer to the center frequency at which the interaction is optimized.

For Bragg region operation, the fractional bandwidth is usually a small number as indicated by Equation 1. Fortunately, it is possible to circumvent the limitations of Equation 7 by using a so-called "phased-array" version of acoustic transducer 17. In such a transducer, the effective direction of the acoustic wave propagation varies as the acoustic frequency changes in such a manner as to keep the interaction angle at an optimum value. Thus, as preferably utilized herein, transducer 17 is of the kind described more fully in my copending application Ser. No. 600,430 filed Dec. 9, 1966, and also described and claimed in Adler application Ser. No. 600,500, filed Dec. 9, 1966. The last-mentioned application issued as Pat. 3,493,759 on Feb. 3, 1970. According to that arrangement, transducer 17 in actuality is an assembly composed of a plurality of individual transducers disposed laterally adjacent one to the next and from one to the next spaced in the direction of sound propagation by one-half wavelength at the center of the range of frequencies through which the sound varies. Additionally, the individual transducers are so coupled to the sound source, corresponding to source 18 of FIG. 1 herein, that adjacent ones of the transducers are instantaneously energized in phase opposition. In this way, for example, a bandwidth of 50% is easily obtained for signals from source 18 having a nominal center frequency of 25 megahertz while always operating in the Bragg region.

Several properties of Bragg region diffraction are of particular interest to the system at hand. As indicated by Equation 1, the diffraction of the light within cell 14 or the deflection angle at any instant is proportional to the frequency of the acoustic waves effecting that diffraction. For weak interaction, which is the typical case in which only a small fractional portion of the incoming light is deflected, the amplitude of the deflected light beam is proportional to the amplitude of the acoustic wave energy. The frequency of the deflected light is upshifted or downshifted by an amount equal to the frequency of the acoustic energy. The particular direction of shift depends upon the sign of the Bragg angle; as shown in FG. 1, the frequency is upshifted. On the other hand, when the acoustic wave fronts are receding from the deflected light, the frequency of that deflected light is downshifted. Still further, the relative phase of the acoustic wave signal carries over to the relative phase of the deflected light, again with either a positive or negative sign depending upon the sign of the Bragg angle. Finally, the transverse field distribution of the deflected light is identical with that of the light incident upon cell 14, provided that the angular spread in the light beam ($\lambda d$, where $d$ is the light beam diameter) is small compared to the diffraction spread of the acoustic energy ($\Lambda/s$). Further detailed description of the Bragg diffraction process appears in the following articles: "Acoustic Beam Probing Using Optical Techniques," Bell System Technical Journal, vol. XLIV, p. 693, 1965, by Cohen et al.; "A Review of Acousto-Optical Deflection and Modulation Devices," Proceedings of the I.E.E.E., vol. 54, p. 1391, 1966, by E. I. Gordon; and "Interaction Between Sound and Light," I.E.E.E. Spectrum, May 1967, by R. Adler.

In operation, an input signal of frequency $f_s$ is applied to transducer 17 which produces a corresponding acoustic signal in cell 14. The acoustic signal as it is propagated through the cell deflects a portion of the incoming beam of light through the angle $\theta_B$ in accordance with the relationship of Equation 3. The deflected beam of light is brought to a diffraction-limited spot in the image plane defined along the active surface 23 at a position $x_s$ according to the relationship $$x_s = \theta_B l_1 = \frac{\lambda l_1}{v_s} f_s \quad (8)$$

Thus, for every different signal frequency $f_s$ introduced at cell 14, there is a corresponding and unique light frequency $f_o + f_s$ at a corresponding and unique position $x_s$ in the focal plane of lens 19 at surface 23. These positions, therefore, lie along an ordinate X in that image plane.

With lens 19 positioned as shown in FIG. 1, the relative phase and amplitude of the various frequency components from source 18 are preserved, being carried over and manifested by the various portions of the deflected light beam which correspond respectively to the various different frequencies of the input signal. That is, the image plane contains the frequency spectrum of the signals introduced into cell 14. The signals of the various different frequencies are linearly arranged along ordinate $x$. The signals of the different frequencies $f_s$ are then recovered by heterodyning their corresponding diffraction spots with the local oscillator or reference light beam following path 26 and which has a frequency $f_o$. The heterodyning action is accomplished by the photosensitive activity of detector 24 by reason of the super imposition of the local oscillator signal at position $x_s$. In practice, the exact location of surface 23 is uncritical, but its disposition at the image plane established by lens 19 is a convenient reference.

Detector 24 is any known radiation-sensitive device, such as photocell, capable of responding to the impingement of radiation from laser 10 to produce a related electrical output signal. Obviously, its radiation-sensitive surface must be large enough to accommodate the range of frequency components of the input signal which, as explained above, have unique positions mutually spaced in the direction X within the focal plane of lens 19. The usual photosensitive detector has a linear transfer characteristic and may detect several signal components concurrently without intermodulation so that the detected components become available at output terminals 30.

As in any heterodyning system, the amplitude and phase of the recovered or detected components of the input signal from source 18 are influenced and determined by the amplitude and phase of the heterodyned signals. Accordingly, for an all-pass linear filter characteristic it is necessary that the local oscillator signal or reference light beam be of constant amplitude and be in phase synchronism with the signal supplied to cell 14 to be modulated by signals from source 18. Of course, the necessary amplitude and phase relations of the reference light beam are readily established with the beam-splitting arrangement of FIG. 1 through which a portion of the output of laser 10 of constant amplitude and unchanged in phase is utilized as the local oscillator signal.

Consequently, the relative phase between the two input signal-frequencies arriving at detector 24 is preserved after mixing by the detector because the local oscillator or reference light field is "flat" and parallel to the focal plane established by lens 19. That is, the reference light beam has the same phase at every position $x_s$ in the focal plane. Hence, the system of FIG. 1 constitutes an all-pass dispersion-free filter, except for limitations imposed by the bandwidth of the interaction in cell 14. The transfer function of such a filter is a constant times a phase factor $e^{j\tau\omega}$, where $\tau$ is a constant representing the time delay of the system and $\omega$ is the radian frequency of the signal being translated.

The present invention permits imposing a transfer or control function on the apparatus which is different from the linear all-pass characteristic of the prior art device. In particular, other transfer characteristics are achieved by modifying the phase fronts of the reference and the diffracted light beams throughout focal plane X. This is conveniently accomplished by causing the effective lengths of the optical paths of the reference and diffracted light beams to vary in accordance with the function desired to be imposed in the apparatus; for example, the variations may be in accordance with a predetermined function of the frequency of the input signals in which case the output signals differ from the input signals in accordance with that same function.

In practicing the invention, control means are included in at least one of the aforedescribed first and second optical systems for effecting the desired control function in the form of variation in phase front or effective optical path lengths of the reference and diffracted beams which are heterodyne in focal plane X.

Figures 2, 3:
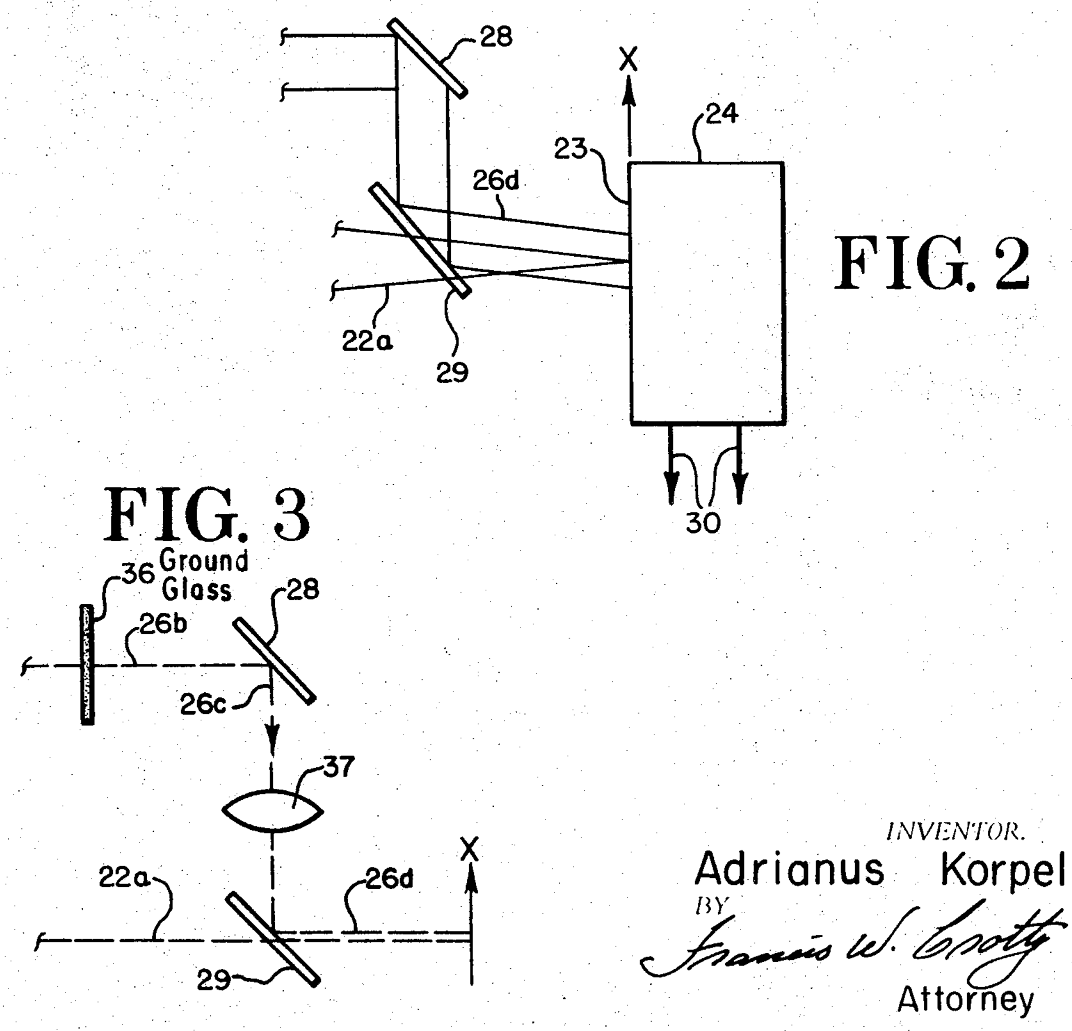
FIG. 2 represents a portion of the arrangement of FIG. 1 modified to practice the present invention.
FIGS. 3, 4 and 5 represent other modifications to the signal transfer apparatus of FIG. 1 utilizing different forms of the invention.

FIG. 2 represents a modification of the optical path 26 of the reference beam of the arrangement of FIG. 1 to achieve a linear phase-frequency transfer characteristic to the end that the apparatus as thus modified simulates a time delay network. More specifically, in FIG. 2 mirror 29 is tilted at an angle other than 45° so that the reference light beam following path **26*d* is tilted relative to the path 22*a* of the light diffracted by cell 14. Consequently, the plane of the phase front of the reference beam is tilted with respect to the focal plane along axis X, where "phase front" is intended to mean the locus of like phase conditions; alternatively this may be referred to as "wave front" of the reference beam. This causes the reference beam to have a phase in the focal plane which varies linearly with change of position $x_s$ along axis X. Because of the linear relationship between position $x_s$ and frequency $f_s$, the network introduces a phase shift which varies linearly with frequency; such network action corresponds to a constant time delay. Consequently, the system of FIG. 2 simulates a variable delay line, exhibiting a delay determined by the angular orientation of mirror 29 which thus provides the control function. The range in time delay available is limited to the transmit time of the acoustic waves through the light beam in cell 14.**

In the embodiment of FIG. 3, the reference beam traverses a wafer 36 of ground glass and then is imaged by a convergent lens 37 onto the image plane X. The control function of the ground glass simulates a random phase filter which may be utilized for the purpose of coding the input signal fed to transducer 17. Decoding is accomplished by employing a similar conjugate system. Such a conjugate system can be realized simply by using the same system as thus far described except that transducer 17 is disposed at the opposite end of cell 14 so that the acoustic waves propagate in the opposite direction. In FIG. 3, mirror 29 is oriented at an angle of 45° to local oscillator path **26*c*.**

Figure 4:
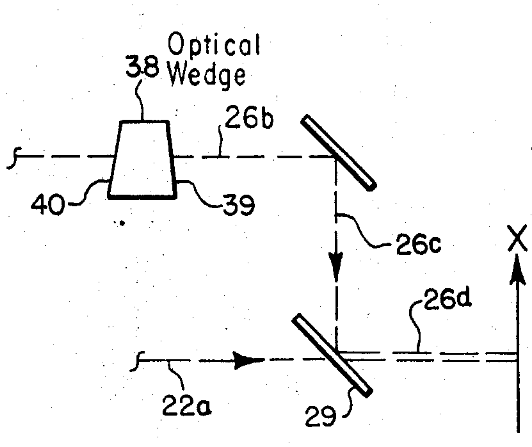

The arrangement of FIG. 4 is the same as that of FIG. 1 except for the insertion into the path 26 of the reference light beam of a wedge-shaped control element 38 having an index of refraction to the light other than unity and with its entrance and exit faces 39 and 40 inclined at an acute angle to path **26*b*. The wedge effectively introduces across the width of the reference light beam different increments of path length or increments of phase delay so that laterally disposed segments of that light differ in phase along the image or focal plane X. The extent of phase change introduced by wedge 38** is a function of the length of the light path through it. Accordingly, if the path increases uniformly from one side to the other, the embodiment may constitute a variable delay line having a linear phase shift-frequency characteristic as in the arrangement of FIG. 2. Of course, the change in path length through the wedge is easily controlled by canting its entrance and exit faces.

Figure 5:
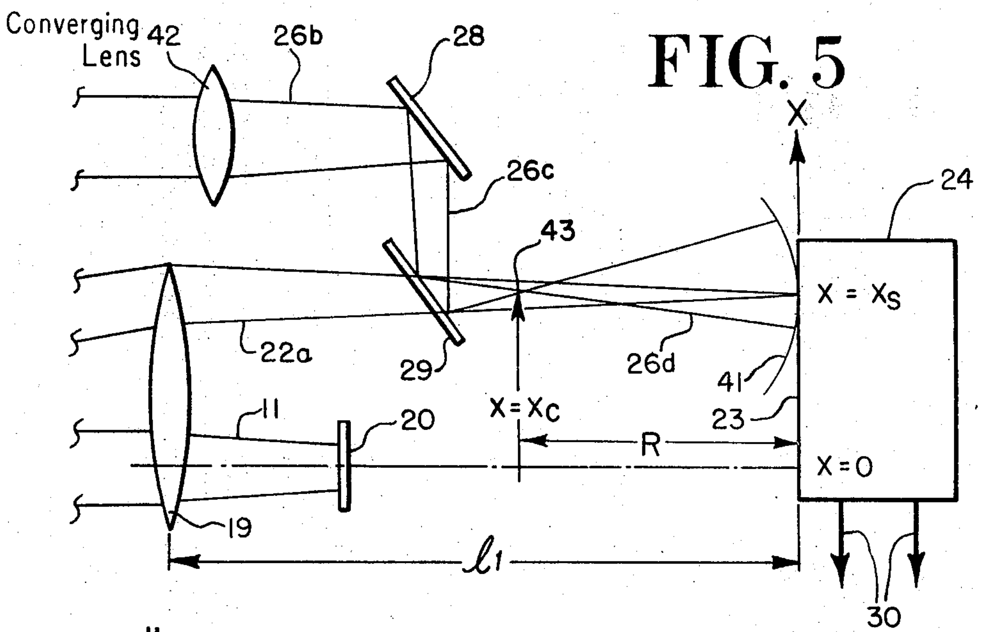

In the systems of the preceding figures, the phase fronts of both the reference light beam and the diffracted light beams are flat even though they need not be parallel as in the embodiments of FIGS. 2 and 4 in which the phase front of the reference beam is tilted relative to that of the diffracted beams emerging from cell 14. By way of contrast, the phase front 41 of the reference light beam along path **26*d* in FIG. 5 is of spherical curvature. In the direction X in the plane of the drawing and in the direction of diffraction of the light carrying the translated signal, such a curved wave front is parabolic. This shaping of the reference beam wave front is achieved by the simple expedient of interposing a convergent lens 42 in path 26*b* of the local oscillator signal, the lens achieving its control function by being in a position to define a focal plane or waist of the local oscillator beam at a point 43 intermediate lens 42 and the focal plane of lens 19 lying along detector surface 23.**

The embodiment of FIG. 5 simulates a network having a phase shift which varies in accordance with the square of the signal frequency from source 18. This is because the reference light beam has a phase quadratically dependent upon position along axis X, that is, the phase of the reference light beam in focal plane X corresponds with the relationship $$-\frac{k}{2R}(x-x_c)^2 \qquad (13)$$

where R is the radius of curvature of phase front 41, $k=2\pi/\lambda$ and $x_c$ is the center-frequency position or the position where the wave front is tangent to the focal plane. It will be recalled that the phase of the reference beam at any position $x_s$ along axis X is imposed on the difference frequency signal, $f_s$, produced by the heterodyning action of detector 24, being imposed with a negative sign in the illustrated case in which the light is upshifted in frequency. Substitution of the relation of Equation 8 for the quantity $x$ in terms of frequency in Equation 13 gives as the phase response of the simulated network the following relationship:

$$\exp\left[+j\frac{\pi\lambda l_1^2}{v_s^2R}(f-f_c)^3\right] \qquad (14)$$

where $f_c$ is the frequency corresponding to the position $x_c$ aligned with cross-over point 43 at which phasefront 41 is tangent with the image plane defined by axis X.

In principle, the time delay of any network whose phase response is some function $\phi(f)$ is $-1/(2\pi)$) times the first derivative of the phase response with respect to frequency. Accordingly, the time delay $\tau_1$ of the ideal lossless system of FIG. 5 is $$\tau_1=-\frac{1}{2\pi}\frac{d\phi}{df}=-\frac{\lambda}{v_s^2}\frac{l_1^2}{R}(f-f_c) \qquad (15)$$

which is linearly proportional to frequency. Consequently, the arrangement of FIG. 5 functions as a dispersive delay line in which the delay is linearly related to frequency. Such delay lines have found use in so-called chirp radar systems to provide pulse expansion or compression, as explained more fully in "The Theory and Design of Chirp Radars," Bell System Technical Journal, vol. 39, pp. 745–808, 1960, by Klauder et al.

Because the delay of the dispersive line, which the system of FIG. 5 simulates, is linear with frequency, that system also is of particular interest for use in transforming time-sequential video information into signals of frequency-multiplex character. A system of that type for producing a television image is disclosed and claimed in my copending application Ser. No. 600,607, filed Dec. 9, 1966, issued as Pat. 3,488,437 on Jan. 6, 1970. Because such a display system is addressed in terms of frequency, however, it is not directly compatible with the time-sequential process of video-signal development currently utilized in accordance with commercial television standards. Consequently, the display system of my prior application Ser. No. 600,607 includes a quantizing system for transforming such a time-sequential signal to one of the frequency-multiplex type for use with such a display system. That quantizing system incorporates an electrical network that functions as a dispersive delay line in which the delay is linear with frequency. Consequently, the system of FIG. 5, which constitutes an optical analog and simulation of such a delay line, may be substituted in the quantizing system of my prior application as part of that type of video display system.

As explained more fully in the aforesaid prior application Ser. No. 600,607, the frequency-addressed manner of display synthesis is especially advantageous because it enables the development of a given picture element in the image display for a sustained period of time even in a display arrangement where the picture element is analyzed and originally generated in a much shorter time interval. By reason of the special significance of the FIG. 5 apparatus for use in such a display system, its operating characteristics or transfer function will now be analyzed in greater detail.

It is a property of a dispersive delay line, such as that simulated by the arrangement of FIG. 5, that an applied short radio-frequency pulse of duration $T_i$ is stretched out to a linearly frequency-swept pulse of duration $T_o$ where $$T_o=\frac{1}{T_i}\left|\frac{d\tau_i}{df}\right| \qquad (16)$$

The ratio of output to input pulse duration $T_o/T_i$ is called the dispersion factor of the system. For the particular system at hand, the differential time delay is in accordance with the relationship $$\frac{d\tau_i}{df}=-\frac{\lambda l_1^2}{v_s^2 R} \qquad (17)$$

Consequently, the dispersion factor may be expressed:

$$\frac{T_o}{T_i}=\frac{T_0^2}{|d\tau_1/df_1|}=\frac{1}{T_i^2}\frac{l_1^2}{Rv_s^2} \qquad (18)$$

In practice with the system of FIG. 5, the maximum output pulse duration cannot exceed the transit time $T_c$ of the acoustic waves through the light beam traversing cell 14. Similarly, the minimum input pulse width $T_i$ is limited by the bandwidth B of the system. That is, $$T_{i\ min.}\cong\frac{1}{B} \qquad (19)$$

Hence, the maximum dispersion factor is given by the relationship $$\left(\frac{T_o}{T_i}\right)_{max.}=BT_c \qquad (20)$$

To analyze in detail the behavior of the dispersive to take into account the finite widths of the reference light optical processing system under discussion, it is necessary beam and of the diffracted light beam which constitutes what may be termed the signal beam. For convenience, it is assumed that both beams are of typical Gaussian distribution. The particular system at hand may be analyzed conveniently with the beam tracing techniques set forth in "Laser Beams and Resonators," Proceedings of the I.E.E.E., vol. 54, p. 1312 (1966) by Kogelnik et al. It is to follow the notation "Beam Tracing and Application." Proceedings of Symposium on Quasi Optics, Polytechnique Press, New York, pp. 379–395, 1964, by Deschamps et al. Using that notation, the one-dimensional transverse field $f_z(x)$ of a Gaussian light beam, deflected by a particular sound frequency component $f_s$ and traveling in the $z$ direction, may be written $$f_z(x)=\frac{a_s}{\sqrt{V}}\exp.\left[\frac{-kx^2}{2V}-jkz+j\omega'_s t\right] \qquad (21)$$

where $\omega'_s=\omega_o+\omega_s$, $\omega_o=2\pi c/\lambda$, $\omega_s=2\pi f_s$, $k=2\pi/\lambda$ and where $c$ is the velocity of light, $a_s$ is proportional to the complex sound amplitude, and V is called the complex variance and in free space is a function of $z$ only, as follows:

$$V=A_o-jz \qquad (22)$$

where $A_o$ is a beam parameter having the dimension of length. At the beam waist, V is real, equal to $A_o$ and is related to the beam diameter $d$ between $1/e$ amplitude points by the relationship $$A_o=\frac{\pi}{\lambda}\left(\frac{d}{2}\right)^2 \qquad (23)$$

In the calculations which follow, for convenience, the beam waves are located in the first focal planes of lenses 19 and 42. For the signal path, this is also the center of cell 14. Although the actual beam waist is located at the exit of laser 10, negligible error is introduced by such an approximation because in the typical application the value of $A_o$ is about 500 meters and the maximum distance $z$ from the laser exit to the "reference" beam waist is of the order of only one meter. From cell 14, at $z=0$, the signal beam passes through lens 19 and is focused at the point where $z=2l_1$, and $$x=x_s=l_1\frac{\lambda}{v_s}f_s \qquad (24)$$

The beam waist at that point of focus is given by the relationship $$V_1=l_1^2/A_o \qquad (25)$$

Thus, for the signal field in the focal plane of lens 19, the field, denoted $g_1(x)$, may be described $$g_1(x)=\frac{a_s}{\sqrt{V_1}}\exp.\left[-\frac{k(x-x_s)^2}{2l_1^2}A_o-j(2kl_1-\omega'_s t\right] \qquad (26)$$

Similar analysis is applicable to the local oscillator beam. Starting from a beam waist $A_o$ in the focal plane to the left of lens 42, the beam waist in the focal plane to the right, a distance $l_2$ away, is given by the relationship $$V_2=l_2^2/A_o \qquad (27)$$

This latter plane is located a distance R to the left of the plane along axis $x$ where the signal beam is focused. In accordance with Equation 22, at the plane along axis $x$ the variance parameter of the local oscillator beam may be expressed $$V'_2=V_2-jR=l_2^2/A_o-jR \qquad (28)$$

Hence, in the focal plane of lens 19 the local oscillator beam, centered at some point $x_c$ as indicated in FIG. 5, can be represented by the expression $$g_2(x)=\frac{a_l}{\sqrt{V'_2}}\exp.\left[-\frac{k(x-x_c)^2}{2V'_2}+j\omega_o t\right] \qquad (29)$$

A large-area square-law photo-detector such as the photo multiplier of detector 24, located effectively in the focal plane along axis $x$, delivers an output current I in accordance with the relationship $$I\propto\int_{-\infty}^{\infty}/g_1(x)+g_2(x)/^2dx \qquad (30)$$

from Equations 12 and 14, $$I\propto a_l^* a_s\exp.\left[\frac{-k(x_c-x_s)^2}{2(V_1+V_2^*)}+j\omega_s t\right] \qquad (31)$$

where the asterisk denotes the complex conjugate.

In Equation 31, the direct-current terms and the phase contributions that are linear in frequency, and therefore non-dispersive, have been omitted. The term containing the variances in Equation 31 may be written $$V_1+V_2^*=\frac{l_1^2+l_2^2}{A_o}+jR \qquad (32)$$

When $$(A_oR)^2 >> (l_1^2+l_2^2)^2 \quad (33)$$

which in a practical embodiment of FIG. 5 using conventional components means that $R^2 >> 1$ mm.$^2$, it is useful to express Equation 32 in the form $$\frac{1}{V_1+V_2^*} = \frac{-j}{R} + \frac{(l_1^2+l_2^2)}{A_oR^2} \quad (34)$$

Equation 31 may then be expressed $$I \propto a_1^* a_s \exp.\left[\frac{jk}{2R}(x_c-x_s)^2 - \frac{k(l_1^2+l_2^2)}{2A_oR^2}(x_c-x_s)^2 + j\omega_s t\right] \quad (35)$$

It will be observed that the first term inside the bracket is identical to the one discussed in conjunction with Equation 15. The second term represents the effect of the finite beam widths of both the local oscillators (reference light) beam and the signal (diffracted light) beam. The physical significance of the secured term perhaps becomes clearer by first considering the size of the diffraction patterns of the local oscillator beam ($d_2$) and of the signal beam ($d_1$) in the focal planes of lenses 42 and 19, respectively. From Equations 23 and 27, $$d_1^2 = \frac{8}{k}\frac{l_1^2}{A_o} \quad (36)$$

$$d_2^2 = \frac{8}{k}\frac{l_2^2}{A_o} \quad (37)$$

Substituting these relationships into Equation 35, $$I \propto a_1^* a_s \exp\left[\frac{jk}{2R}(x_c-x_s)^2 - \frac{k^2(d_1^2+d_2^2)}{16R^2}(x_c-x_s)^2 + j\omega_s t\right] \quad (38)$$

The second term of this equation indicates a drop-off in the mixer signal current I when the diffraction spot of the signal beam (at $x_s$) moves away from the center of the local oscillator beam. This arises because of two separate effects. In the first place, the total local oscillator phase curvature across the diffraction limited spot $d_1$ becomes larger and causes partial cancellation of the mixing signal. This effect is proportional to the value of $(d_1/R)^2$. Secondly, the local oscillator signal amplitude decreases. That effect is inversely proportional to the square of the local oscillator spot size in the mixing plane along axis $x$ and which is the distance R away from the local oscillator beam focus where its spot diameter has the value $d_2$. Taking into account the fact that a spot diameter $d_2$ implies a beam divergence of the order $\lambda/d_2$, it follows that the spot size in the mixing plane is proportional to $R/d_2$. Thus, the second mentioned effect is proportional to the value $(d_2/R)^2$, which is in agreement with Equation 35.

In order, then, to obtain the transfer function of the system, it is necessary to remember that each position $x_s$ corresponds to a particular acoustic frequency component $f_s$ according to the relationship $$x_s = l_1\frac{\lambda}{v_s}f_s = \frac{l_1}{kv_s}\omega_s \quad (39)$$

Substituting Equation 39 into Equation 35, it is found that the transfer function $Y(\omega)$ of the overall network, apart from amplitude coefficients and for $\omega > o$, is $$Y(\omega) = \exp\left[\frac{jl_1^2}{2kRv_s^2}(\omega-\omega_c)^2 - \frac{l_1^2(l_1^2+l_2)^2}{2A_oR^2kv_s^2}\omega-\omega_c)^2\right] \quad (40)$$

The time delay of the system is expressed $$\tau_i = \frac{-l_1^2}{kRv_s^2}(\omega-\omega_c) \quad (41)$$

The differential time delay is in accordance with:

$$\frac{d\tau_i}{df} = \frac{-2\pi l_1^2}{kRv_s^2} \quad (42)$$

which is in agreement with Equation 17.

Given the transfer function, Fourier techniques are used to compute the network response to a given input function. For an input signal $E_i(t)$ as follows:

$$E_i(t) = e^{-4}\left(\frac{t}{T_i}\right)^2 \cos \omega_1 t \quad (43)$$

where $T_i$ is the Gaussian width between $1/e$ points, the Fourier transform of $E_i(t)$, $E_i(\omega)$, is given by the expression $$E_i(\omega) = \frac{T_i}{4}\sqrt{\pi}\left\{\exp\left[-\frac{T_i^2(\omega_1)^2}{16}\right] + \exp\left[\frac{-T_i^2}{16}(\omega+\omega_1^2\right]\right\} \quad (44)$$

The input signal of the form expressed in Equation 43 is selected both because of mathematical convenience and because it is of a conveniently obtainable shape. The output waveform $E_o(t)$ is obtained from the network transfer function by taking the inverse transform. Since $$Y(-\omega) = Y^*(\omega)$$

for a real value of $E_o$, $$E_o(t) = \frac{1}{2\pi}\int_{-\infty}^{\infty} Y(\omega)e^{j\omega t}dw \quad (45)$$

Substituting Equations 44 and 40 into Equation 45, the output waveform may be expressed $$E_o(t) = Re\left[C \exp\left\{\frac{-4t^2}{T_o^2} + j\left(\omega_c t - \frac{\Delta\omega}{2T_o}t^2\right)\right\}\right] \quad (46)$$

For the sake of simplicity, symmetrical coincidence of the local oscillator beam and the signal beam corresponding to the carrier frequency have been assumed, i.e., $\omega_1=\omega_c$, and Gaussian terms with large negative exponents have been neglected. Also, the parameters $T_o$ and $\Delta\omega$ have been introduced. $T_o$ is the time duration of the output pulse between $1/e$ points, and $\Delta\omega$ corresponds to the spread of instantaneous frequencies within the Gaussian envelope of $E_o(t)$. The parameter C is a complex quantity which is independent of time. The parameters $T_o$ and $\Delta\omega$ are given by their relationship:

$$\left(\frac{T_o}{T_i}\right)^2 = \left[1+\frac{16(1+l_2^2/l_1^2}{T_c^2T_i^2\sigma^2}\right]\left[1+\frac{16T_c^4\sigma^2}{[T_c^2T_i^2\sigma^2+16(1+l_2^2/l_1^2)]^2}\right] \quad (47)$$

$$\Delta\omega = \frac{32T_c^2\sigma}{T_o[T_c^2T_i^2\sigma^2+16(1+l_2^2/l_1^2)]} \quad (48)$$

where $$\sigma = \frac{k}{2}\cdot\frac{Rv_s^2}{l_1^2} = \pi\Big/\frac{d\tau_i}{df} \quad (49)$$

and $T_c=d/v_s$, the transit time of the acoustic waves through $1/e$ points of the incident light beam.

It is of interest to consider some limiting cases. When $T_1 \rightarrow o$, and using the assumption $$A_oR \gg (l_1^2+l_2^2) \text{ or } \sigma T_c^2 \gg 4(1+l_2^2/l_1^2)$$

it is found from Equation 47 that $$T_o \rightarrow T_c/\sqrt{1+l_2^2/l_1^2} \quad (50)$$

which, as mentioned before, indicates that the output pulse cannot exceed that transit time $T_c$. When $T_1 \rightarrow \infty$, it is found that $T_o \rightarrow T_1$, $\Delta\omega \rightarrow o$, which is to be expected for the case of quasi-CW operation. In the in-between region where $$16\left(1+\frac{l_2^2}{l_1^2}\right)\Big/T_c^2\sigma^2 \ll T_1^2 \ll 4/\sigma$$

it is found that $$\frac{T_o}{T_i} \simeq \frac{4}{\pi} \frac{l_1^2 \lambda}{R v_s^2} \cdot T_i^2 \qquad (51)$$

which is in agreement with Equation 18 apart from a factor of $4/\pi$ which results from the Gaussian beam shape.

When $R \to \infty$, it is found again that $T_o \to T_i$, $\Delta\omega \to o$. This is to be expected because this particular case corresponds to a plane-wave phase front for the reference light beam which results in dispersionless operation.

As developed herein, the transfer function cannot be employed to determine the characteristics in the case of very extreme dispersion, that which occurs as the radius of curvature of the phase front goes to zero. This arises because that condition violates the assumption of Equation 34. By using the exact formulation, however, it may be shown that in this case it is also true that $T_o \to T_c$, as is to be expected purely from the standpoint of physical considerations.

To perhaps more fully comprehend some of the practical physical ramifications of systems of the kind generally illustrated in FIGS. 2 to 5, it is informative to examine certain results obtained in actual operation of a system constructed in accordance with FIG. 5. Lens 42 had a focal length of 35 centimeters, a 0.3 milliwatt helium-neon laser produced a beam of light having a wavelength of 6328 angstroms. The laser was followed by a cylindrical telescope that expanded the light beam width, at the $1/e$ amplitude points, from an initial diameter of 1.4 millimeters upon entrance to cell 14 to a value of 1.8 millimeters. The latter operated with a center frequency of 28 megahertz and a bandwidth of 14 megahertz, using an electroacoustical transducer of the so-called phased array type described earlier. Cell 14 had a light aperture of 7.5 centimeters and an interaction length $s$ of 2.5 centimeters. Lens 19, which forms the far-field pattern of the deflected light beam in the focal plane along axis $x$, had a focal length of 58 centimeters. Mirrors 27 and 28 were of a quarter-wave-length-flatness front-surface type and mirrors 13 and 29 were coated so as to be 30% reflective and 70% transmissive. The optical aperture of the reference light beam route in the exemplary system was two centimeters, which constituted the limiting optical aperture of the entire system since the light beam otherwise could have been blown up to fill the entire aperture of cell 14. Detector 14 was an RCA 4463S20 surface-type photo multiplier.

Figure 6:
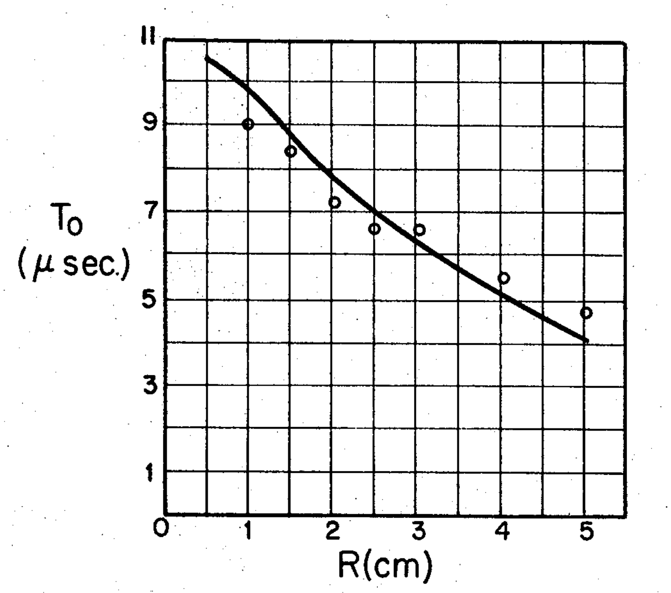
FIG. 6 is a curve used in explaining the operation of the apparatus of FIG. 5.

An input radio-frequency pulse $T_i$ of 0.5 microsecond duration and a constant carrier frequency $f_1$ of 28 megahertz produced an expanded output pulse $T_o$ from terminals 30 which was displayed on an oscilloscope to enable the measurement of its duration. $T_o$ was recorded and plotted against the radius of curvature R as shown in FIG. 6. The curve depicted in that figure is that theoretically obtaned from Equation 47. As can be observed, the experimentally derived points, indicated by the circled dots, agree reasonably well with the theory. The small error existing is ascribable to the measurement of the loaction of the focal plane of lens 42 and to error arising from noise in the reading of the $1/e$ amplitude points of the output pulse. Also, the particular input pulse shape only approximated the Gaussian time function for which the theoretical curve was derived. Furthermore, lens aberrations were not taken into account.

The various arrangements illustrated in the drawings and discussed above demonstrate a simple and quite versatile technique for simulating, by use of an optical system, a variety of electrical network responses. The light-sound interaction cell of this system may be easily fabricated and lends itself to efficient wide-band high-frequency operation. The optical components that are used to determine the desired phase relations and consequently the transfer function imposed upon the simulated network may be of extremely simple design and construction, even for networks which are difficult to synthesize by purely electronic or acoustic means. Although a detailed demonstration has been afforded only wtih respect to the dispersive delay line of the network of FIG. 5, that example in its detailed analysis, nevertheless, illustrates the versatility of the system. Such versatility is exemplified by the ease with which the dispersion characteristics can be varied merely by changing the location of but a single lens.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An electro-optical signal transfer apparatus comprising:

means for developing a beam of spatially coherent light directed along a first path;

a source of input signals which may have a plurality of different frequency components with respective amplitude-time characteristics;

acoustic means responsive to said input signals for propagating acoustic waves of corresponding frequency and amplitude across said first path to diffract portions of said light beam along a plurality of paths respectively representative of said different frequency components and with each such portion having an intensity corresponding to the amplitude of the respective one of said frequency components;

a first optical system disposed in said plurality of paths for focusing said diffracted beam portions in a predetermined image plane wherein said diffracted beam portions have unique positions determined by the different frequency components of said input signals that they represent, respectively;

means for supplying a reference beam of spatially coherent light the intensity and phase characteristics of which have a predetermined relation to those of said first-mentioned beam and for directing said reference beam along another path;

a second optical system disposed in said other path for superposing said reference beam upon said diffracted beam portions at said image plane;

control means included in at least one of said first and second optical systems for causing the phase relation of said reference and diffracted light beams to vary at said unique positions in said image plane in accordance with a predetermined function of the frequency of said input signals;

and detector means at said image plane for deriving from said superposed reference and diffracted beams output signals related to said input signals in accordance with said predetermined function.

2. An electro-optical signal transfer apparatus in accordance with claim 1 in which said control means comprises: an optical element disposed only in the path of said reference beam.

3. An electro-optical signal transfer apparatus in accordance with claim 1 in which the phase relation of said reference and said diffracted light beams varies in accordance with a linear function of the frequency of said input signals.

4. An electro-optical signal transfer apparatus in accordance with claim 1 in which said control means includes an optical element for tilting the relative phase fronts of said reference and said diffracted beams in said image plane.

5. An electro-optical signal transfer apparatus in accordance with claim 1 in which said control means comprises: means for randomly changing the phase fronts of said beams relative to one another.

6. An electro-optical signal transfer apparatus in accordance with claim 3 in which said control means comprises: means for delaying the phase of said reference beam in an amount which increases linearly from one side to the other of a path of said reference beam.

7. An electro-optical signal transfer apparatus in accordance with claim 6 in which said control means comprises: a wedge-shaped body of material having an index of refraction for said reference beam other than unity and disposed with at least one wedge face inclined to the path of said reference beam.

8. An electro-optical signal transfer apparatus in accordance with claim 1 in which said control means varies the phase relation of said reference and said diffracted light beams in accordance with the square of the frequency of said input signals.

9. An electro-optical signal transfer apparatus in accordance with claim 8 in which said control means comprises: an optical element for effecting at said focal plane a phase front for said reference beam having a spherical configuration.

10. An electro-optical signal transfer apparatus in accordance with claim 8 in which said control means includes an optical element for effecting at said focal plane a phase front for said reference beam having a parabolic configuration in the direction of said plurality of paths.

11. An electro-optical signal transfer apparatus in accordance with claim 8 in which said optical element is a convergent lens having a focal point between the position of said lens and said focal plane.

References Cited

UNITED STATES PATENTS 3,462,603 8/1969 Gordon ------------ 250—199

ROBERT L. GRIFFIN, Primary Examiner

A. J. MAYER, Assistant Examiner

U.S. Cl. X.R.

307—88.3; 350—161